Aug. 21, 1951 P. NEUWIRTH 2,565,392

HORIZONTAL DEFLECTION CIRCUIT

Filed April 16, 1949

INVENTOR
PAUL NEUWIRTH
BY Theodore Hafner
ATTORNEY

Patented Aug. 21, 1951

2,565,392

UNITED STATES PATENT OFFICE 2,565,392

HORIZONTAL DEFLECTION CIRCUIT

Paul Neuwirth, New York, N. Y., assignor to Tele-Tone Radio Corporation, a corporation of New York Application April 16, 1949, Serial No. 88,005

9 Claims. (Cl. 315—27)

This invention relates to a deflection circuit for cathode ray tubes especially for television and more particularly a circuit adapted to be coupled to a high impedance yoke.

In the past horizontal deflection circuits of the type described use low impedance deflection coils, a transformer and a tertiary coupling coil to produce the high voltage necessary to cause sufficient deflection of the cathode ray.

In another deflection system, a high impedance coil is used but there a separate high power supply is provided which is expensive and requires additional control means.

One of the objects of this invention is to provide a simple and effective high voltage supply derived from the deflection circuit itself, with a minimum of accessories, circuit elements and connections.

Another object of the invention is a direct coupling of the deflecting coil or coils to the output circuit of the horizontal deflection tube and the provision of a high voltage pulse source in that output circuit itself.

A further object of the invention is to produce the high voltage required without affecting linearity of the sweep as would be the case in a transformer coupling requiring special design to overcome non-linearity.

A more specific object of the invention is a series resonant circuit coupled together with a deflection coil or coils to the output electrode of the horizontal driver or output tube, or a tube or circuit controlled thereby.

In a further embodiment of the invention, the resonance frequency of the series resonant circuit is designed to correspond substantially to the retrace frequency of the horizontal deflection coil or coils preferably at 80 kilocycles.

In another embodiment of the invention, the series resonant circuit cooperates with a rectifier to provide the required high voltage connection at the appropriate moment.

These and other objects of the invention will be more fully illustrated in the accompanying drawings a description of which follows.

Figure 1:
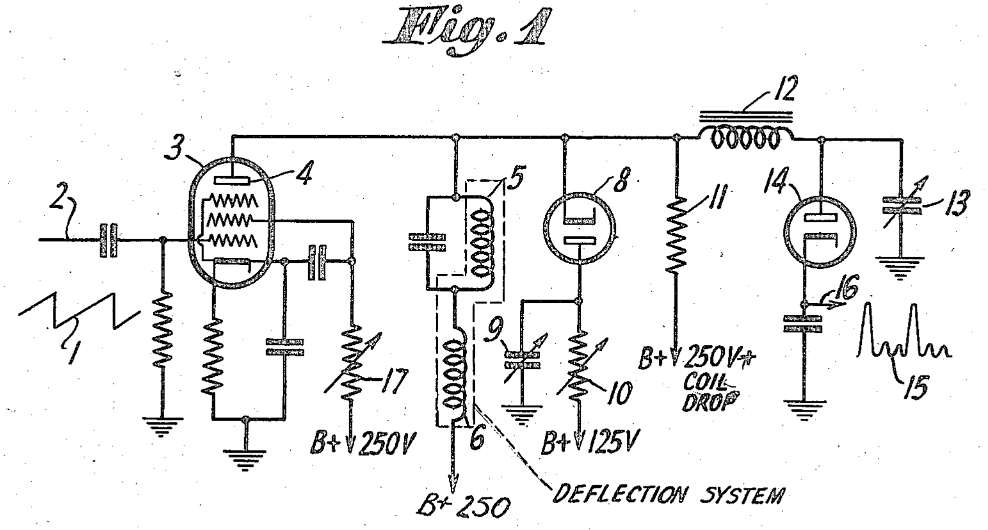
Figure 1 shows diagrammatically a horizontal deflection circuit according to the invention.

In Figure 1 the synchronizing signals in the form of sawtooth waves 1 are applied at 2 to the input circuit of a horizontal driver tube 3 which may be a pentode or any other electronic discharge tube. Directly coupled to the output electrode 4 of tube 3 there are two horizontal deflection coils 5, 6 one shunted by condenser 7 in well known manner. 8 is a damper diode connected over variable condenser 9 to ground and over variable resistance 10 to B+ of say 125 volts.

Part 12 is a powdered iron core choke forming together with a fixed or variable condenser 13 a series resonant circuit. Condenser 13 may be omitted, however, if the capacity of the rectifier diode 14 together with the distributed capacity of choke 12 are sufficient to tune to the desired resonant frequency of say 80 kilocycles.

Coil 11 is a choke of high Q value and low distributed capacity.

The circuit values have been determined in a particular example of the invention as being of the order of 390 microhenry with a capacity of 10 micromicrofarad.

The high voltage connection is diagrammatically shown at 15 and may be taken off in the form of a direct current component from the output electrode of rectifier diode 14.

As shown in Figure 1, tube 3 works directly into yoke 5, 6 and damper tube 8 which should be made to operate at maximum efficiency to reduce the affect of the direct current through yoke 5, 6.

The additional decentering field may be neutralized by applying a higher than B+ potential through a large impedance such as resistor 11 across yoke 5, 6 as already stated above.

The additional voltage should preferably be equal to the D. C. voltage drop in yoke 5, 6.

Linear adjustment means and width adjustment means may be incorporated in the driving circuit to output tube 3 and in damper tube circuit 8. In the former tube a wave shaping circuit may be inserted in front of point 2. In the latter tube the effect may be achieved by properly adjusting condenser 9 and resistor 10 or by inserting an inductance in the damper tube circuit which is not shown because such insertion is well known to any one familiar with the art.

Control of the screen voltage in the output tube through resistor 17 may also serve as width control.

The high voltage—usually obtained in the prior art by a separate output transformer—is derived in accordance with this invention from the output of the rectifier tube at 16.

Figure 2:
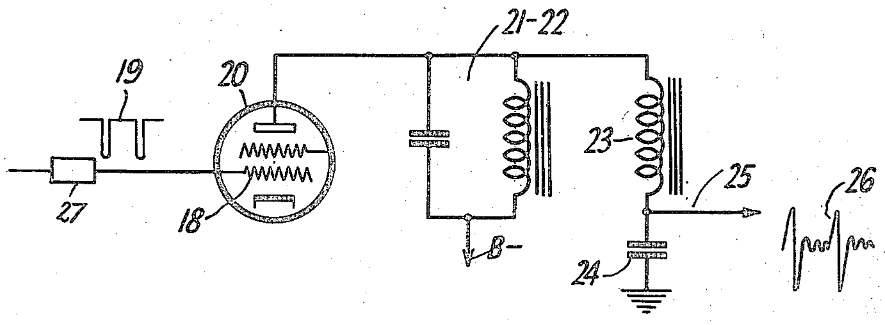
Figure 2 shows diagrammatically a more general application of the inventive principle involved.

Figure 2 shows a general application of the invention to produce a high voltage for any desired purpose.

In this circuit diagram, 16 represents a screen grid or any other appropriate electronic discharge tube to the input circuit of which there is applied at 18 a pulse train of wave form 19.

Output electrode 20 is connected to a load circuit shown in the form of a parallel resonant circuit 21, 22.

Output electrode 20 is also connected to the series resonant circuit 23, 24.

The junction point of the series resonant circuit 23, 24, at 25 may serve to take off the required high voltage kicks such as shown at 26, or line 25 may be connected to a rectifier not shown to obtain a unidirectional high voltage similar to that obtained in Figure 1.

Parallel and series resonant circuits should preferably have substantially the same resonant frequency.

A wave shaping circuit is indicated at 27 but since it is well known in the art no further description appears to be necessary.

I claim:

1. In a deflection circuit for cathode ray tubes, an electronic discharge device, an input circuit therefor controlled by sawtooth waves and an output circuit therefor directly connected to high impedance deflecting means, said output circuit being also connected to a series resonant circuit tuned substantially to the same frequency as said deflecting means, and means for deriving high voltage pulses from an intermediate point of said series resonant circuit.

2. Deflection circuit according to claim 1 wherein said series resonant circuit include a choke and a condenser connected in series therewith, said high voltage pulses being taken off from the junction point of said choke and condenser.

3. Deflection circuit according to claim 1 wherein said series resonant circuit includes a choke and a condenser connected in series therewith, said high voltage pulse means including a rectifier having an input circuit connected to the junction point of said choke and condenser.

4. Deflection circuit according to claim 1 wherein said series resonant circuit include a choke, and a condenser connected in series therewith, said high voltage pulse means including an electronic discharge tube having an input circuit connected to the junction point of said choke and condenser, and an output circuit controlling utilization means; the capacity of said tube together with the distributed capacity of said choke being sufficient to tune to the desired resonance frequency.

5. Deflection circuit according to claim 1 wherein said series resonant circuit includes a choke and a variable condenser connected in series therewith, said high voltage pulse means including a rectifier having an input circuit coupled to the junction point of said choke and condenser, the capacity of said rectifier together with the distributed capacity of said choke being sufficent to tune to the desired resonance frequency, said resonance frequency being of the order of 80 kilocycles.

6. Deflection circuit according to claim 1 wherein said series resonant circuit includes a choke and a condenser connected in series therewith, said high voltage pulse means including, a rectifier diode having an input circuit coupled to the junction point of said choke and condenser, the capacity of said diode together with the distributed capacity of said choke being sufficient to tune to the desired resonance frequency, said choke having a high Q value and low distributed capacity.

7. Deflection circuit according to claim 1 wherein said series resonant circuit includes a choke and a condenser connected in series therewith, said high voltage pulse means including a rectifier diode having an input circuit coupled to the junction point of said choke and condenser, the capacity of said diode together with the distributed capacity of said choke being sufficient to tune to the desired resonance frequency, said choke having a Q value of the order of 400 microhenry and a distributed capacity of the order of 10 micromicrofarad.

8. Deflection circuit according to claim 1 wherein there is a damping diode having a cathode connected to said output circuit, an adjustable condenser coupling said anode to ground, and an adjustable resistance coupling said anode to a high voltage source.

9. Deflection circuit according to claim 1 wherein said electronic discharge device is a pentode having a control grid connected to be controlled by a sawtooth wave, an intermediary grid capacitively coupled to the cathode and resistance coupled to a high voltage source; the screen grid being directly coupled to said cathode.

PAUL NEUWIRTH.

REFERENCES CITED

The following references are of record in the file of this patent:

UNITED STATES PATENTS

| Number | Name | Date |
|---|---|---|
| Re. 21,400 | Blumlein | Mar. 19, 1940 |
| 2,074,495 | Vance | Mar. 23, 1937 |
| 2,149,077 | Vance | Feb. 28, 1939 |
| 2,182,608 | Andrieu | Dec. 5, 1939 |
| 2,223,990 | Holmes | Dec. 3, 1940 |
| 2,265,988 | Andrieu | Dec. 16, 1941 |
| 2,299,571 | Dome | Oct. 20, 1942 |
| 2,438,359 | Clapp | Mar. 23, 1948 |
| 2,440,418 | Tourshou | Apr. 27, 1948 |
| 2,443,030 | Foster | June 8, 1948 |
| 2,449,792 | Snyder, Jr. | Sept. 21, 1948 |